United States Patent
Barnes et al.

(10) Patent No.: US 7,739,498 B2
(45) Date of Patent: *Jun. 15, 2010

(54) METHOD AND APPARATUS FOR MULTI-TABLE ACCESSING OF INPUT/OUTPUT DEVICES USING TARGET SECURITY

(75) Inventors: Brian C. Barnes, Round Rock, TX (US); Geoffrey S. Strongin, Austin, TX (US); Rodney W. Schmidt, Dripping Springs, TX (US)

(73) Assignee: GlobalFoundries, Inc., Grand Cayman (KY)

( * ) Notice: Subject to any disclaimer, the term of this patent is extended or adjusted under 35 U.S.C. 154(b) by 2410 days.

This patent is subject to a terminal disclaimer.

(21) Appl. No.: 10/047,188

(22) Filed: Jan. 15, 2002

(65) Prior Publication Data
US 2004/0054895 A1    Mar. 18, 2004

(51) Int. Cl.
*H04L 9/32* (2006.01)
(52) U.S. Cl. .................. 713/166; 713/164; 713/167; 726/1; 717/126; 717/127
(58) Field of Classification Search .......... 710/201; 726/26, 27, 1; 713/164–167; 709/214, 226; 711/221, 100, 156, 200, 169, 163; 700/21, 700/23; 719/318, 315; 717/127, 126; 707/2, 707/100
See application file for complete search history.

(56) References Cited

U.S. PATENT DOCUMENTS

| | | | | |
|---|---|---|---|---|
| 4,104,721 A | | 8/1978 | Markstein | 711/164 |
| 4,173,783 A | * | 11/1979 | Couleur et al. | 710/3 |
| 4,300,192 A | * | 11/1981 | Couleur et al. | 711/153 |
| 4,926,476 A | * | 5/1990 | Covey | 711/163 |
| 5,018,096 A | * | 5/1991 | Aoyama | 711/164 |
| 5,255,384 A | | 10/1993 | Sachs et al. | 395/425 |
| 5,293,597 A | * | 3/1994 | Jensen et al. | 711/207 |
| 5,469,556 A | * | 11/1995 | Clifton | 711/163 |
| 5,802,590 A | | 9/1998 | Draves | 711/164 |
| 5,822,749 A | * | 10/1998 | Agarwal | 707/2 |
| 5,890,189 A | * | 3/1999 | Nozue et al. | 711/100 |
| 6,477,612 B1 | * | 11/2002 | Wang | 711/2 |
| 6,578,090 B1 | * | 6/2003 | Motoyama et al. | 719/315 |
| 6,775,779 B1 | * | 8/2004 | England et al. | 713/200 |
| 6,823,433 B1 | | 11/2004 | Barnes et al. | 711/163 |

(Continued)

FOREIGN PATENT DOCUMENTS

GB    2 356 469    5/2001

(Continued)

OTHER PUBLICATIONS

PCI Local Bus, *PCI Local Bus Specification*, Production Version, Revision 2.1, Jun. 1, 1995, 299 pages.

(Continued)

*Primary Examiner*—Thanhnga B Truong
(74) *Attorney, Agent, or Firm*—Williams, Morgan & Amerson, P.C.

(57) ABSTRACT

A method and an apparatus for performing an I/O device access using targeted security. A software object is executed. A security level for the software object is established. A multi-table input/output (I/O) space access is performed using at least one of the security levels. The function of the object is executed.

18 Claims, 12 Drawing Sheets

U.S. PATENT DOCUMENTS

2001/0021966 A1* 9/2001 Kawasaki et al. ............ 711/163
2002/0129299 A1  9/2002 McKee ......................... 714/38

FOREIGN PATENT DOCUMENTS

GB       2 356 469 A    5/2001

OTHER PUBLICATIONS

International Search Report dated Feb. 18, 2004 for International application No. PCT/US02/29042 Filed Sep. 12, 2002/.
Chiueh, Tzi-cker et al.; *Integrating Segmentation and Paging Protection for Safe, Efficient and Transparent Software Extensions*, 1999, 14 pages.
U.S. Appl. No. 09/999,881, filed Oct. 31, 2001, Barnes et al.
U.S. Appl. No. 10/047,188, filed Jan. 14, 2002, Barnes et al.
International Search Report dated Jul. 7, 2003 for International application No. PCT/US02/25401, Filed Aug. 9, 2002.
Chiueh, Tzi-cker; Venkitachalam, Ganesh; Pradhan, Prashant; *"Integrating Segmentation and Paging Protection for Safe, Efficient and Transparent Software Extensions;"* XP-000919654, Computer Science Department, State University of New York at Stony Brook, 1999, pp. 140-153.
Gilmont, T. et al; *"Enhancing Security in the Memory Management Unit"*; IEEE Xplore; Release 1.8; Euromicro Conference, 1999; 9 pgs.
Morris, et al.; *"Fast Communication in Distributed Systems Using the Networked Virtual Memory System;"* Fujitsu Labs., Ltd., Jul. 1994; pp. 1-6.
Ozaki, et al.; *"Software Fault Tolerance in Architectures with Hierarchical Protection Levels"*; Aug. 1988 IEEE Micro; pp. 30-43.
Office Action dated May 6, 2006 regarding U.S. Appl. No. 09/999,881.
Final Office Action dated Nov. 2, 2005 regarding U.S. Appl. No. 09/999,881.
Office Action Reopening Prosecution dated Aug. 8, 2006 regarding U.S. Appl. No. 09/999,881.
Office Action dated Feb. 8, 2007 regarding U.S. Appl. No. 09/999,881.
Office Action dated Aug. 10, 2007 regarding U.S. Appl. No. 09/999,881.
Final Office Action dated Feb. 6, 2008 regarding U.S. Appl. No. 09/999,881.
Office Action dated Mar. 15, 2005 regarding U.S. Appl. No. 10/044,667.
Final Office Action dated Sep. 30, 2005 regarding U.S. Appl. No. 10/044,667.
Office Action Reopening Prosecution dated May 16, 2007 regarding U.S. Appl. No. 10/044,667.
Office Action dated Nov. 1, 2007 regarding U.S. Appl. No. 10/044,667.
Final Office Action dated May 12, 2008 regarding U.S. Appl. No. 10/044,667.
Office Action Oct. 13, 2008 regarding U.S. Appl. No. 10/044,667.

* cited by examiner

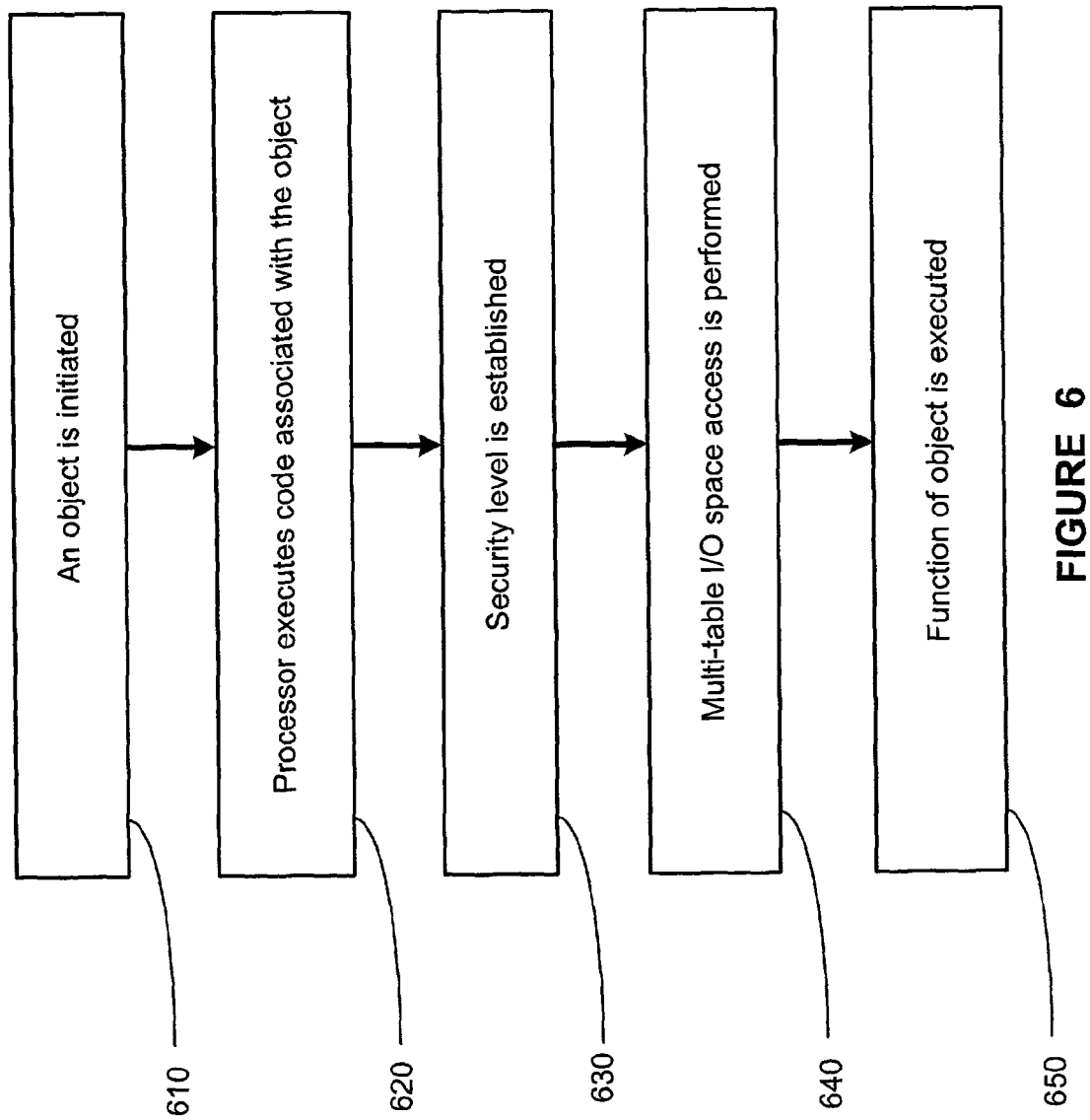

METHOD AND APPARATUS FOR MULTI-TABLE ACCESSING OF INPUT/OUTPUT DEVICES USING TARGET SECURITY

BACKGROUND OF THE INVENTION

1. Field of the Invention

This invention relates generally to computer systems operations, and, more particularly, to a method and apparatus for performing a physical address-based security scheme to provide secure input/output (I/O) access.

2. Description of the Related Art

Computers or computing systems are important elements in many of today's industrial and home applications. Many systems, such as manufacturing systems, power systems, product distribution systems, document systems, etc., are powered by computer systems that utilize processors. These processors perform a variety of tests and execute a plurality of software programs that interact with each other. Many times input/output devices permit manipulation of operations of processors and software programs. A standard level of security is desirable during operation of the processor such that certain software structures (e.g., software objects, subroutines, standalone programs, etc.) can be controlled and given priority over other software structures. Many times, access to certain software structures and certain processor functions are restricted in order to prevent unauthorized or inadvertent access or operation by processors. Current computer architectures include a scheme for utilizing virtual memory that uses several system-defined tables that are resident in the physical memory within a computer system. The entry within these system tables is generally pre-defined and includes reserved sections that restrict access to certain software structures.

Computing systems have evolved from single task devices to multitask devices. A computing system employs an operating system to execute the many tasks and manage their resource utilization. Typically, when a user invokes a process (e.g., opens an application program such as a word processor), the operating system dedicates certain computing resources (e.g., portions of memory) for use by the task. Many computing resources, however, cannot or are not dedicated in this manner. Printer drivers, for example, are frequently used by multiple tasks. Operating systems therefore also usually define access rights and protocols for tasks relative to such shared resources. Thus, by virtue of the operating system's efforts, computing systems can simultaneously execute multiple tasks in an efficient manner.

One important aspect in such a computing environment is "security." Computing systems that multitask employ security and protection services to protect their operating system from user processes, and to protect the processes from each other. Without protection, a rogue program could unintentionally destroy the program code or data in the memory space belonging to the operating system or to another process. Note that, at least in this context, security does not imply thwarting intentional malicious acts, although it contemplates protecting against these as well.

Many processors, such as x86 processors, provide a plurality of security levels, such as privilege levels. Turning now to FIG. 1, one example of the representation of a plurality of security levels is illustrated. The inverse pyramid styled structure in FIG. 1 illustrates four levels of security (privilege) level 0, level 1, level 2, and level 3 through level n. The operating system is afforded a base privilege level such as level 0. The privilege afforded by the security level 0 allows a particular software structure to obtain access provided by subsequent security levels such as levels 1-3. If a software structure is allowed only a privilege of security level 2, that particular software structure only has access and control over operations that are afforded by privilege levels 2 and 3. In many cases, popular operating systems, such as Microsoft Windows®, do not utilize the full capabilities of the plurality of privilege levels. Some software operating systems only use two privilege levels, such as level 0 and level 3.

A user application program may execute at security level 3 while the operating system services and all drivers operate at security level 0. This can open the computer system to a variety of security risks. This is particularly true since most drivers have access to all of the computer resources because they are operating at the most privileged level, security level 0. Therefore, an unauthorized access to a driver that controls an I/O device in the computer system, such as a modem device, can cause unauthorized operation of the I/O device resulting in system destruction or misuse. Furthermore, unauthorized access to system I/O devices can cause loss of valuable data and software programs.

The present invention is directed to overcoming, or at least reducing the effects of, one or more of the problems set forth above.

SUMMARY OF THE INVENTION

In one aspect of the present invention, a method is provided for performing an I/O device access using targeted security. A software object is executed. A security level for the software object is established. A multi-table input/output (I/O) space access is performed using at least one of the security levels. The function of the object is executed.

In another aspect of the present invention, an apparatus is provided performing an I/O device access using targeted security. The apparatus of the present invention comprises: a processor coupled to a bus; means for coupling at least one software object to the processor; an input/output (I/O) device; and an (I/O) access interface coupled to the bus and the memory unit, the memory access interface to provide the processor a multi-level table I/O space access of at least a portion of the memory unit based upon at least one security level, in response to the processor executing the software object.

BRIEF DESCRIPTION OF THE DRAWINGS

The invention may be understood by reference to the following description taken in conjunction with the accompanying drawings, in which like reference numerals identify like elements, and in which:

FIG. 6 illustrates a flowchart depiction of a method of performing I/O-space/I/O-memory access using a security scheme in accordance with one embodiment of the present invention;

Figure 1:
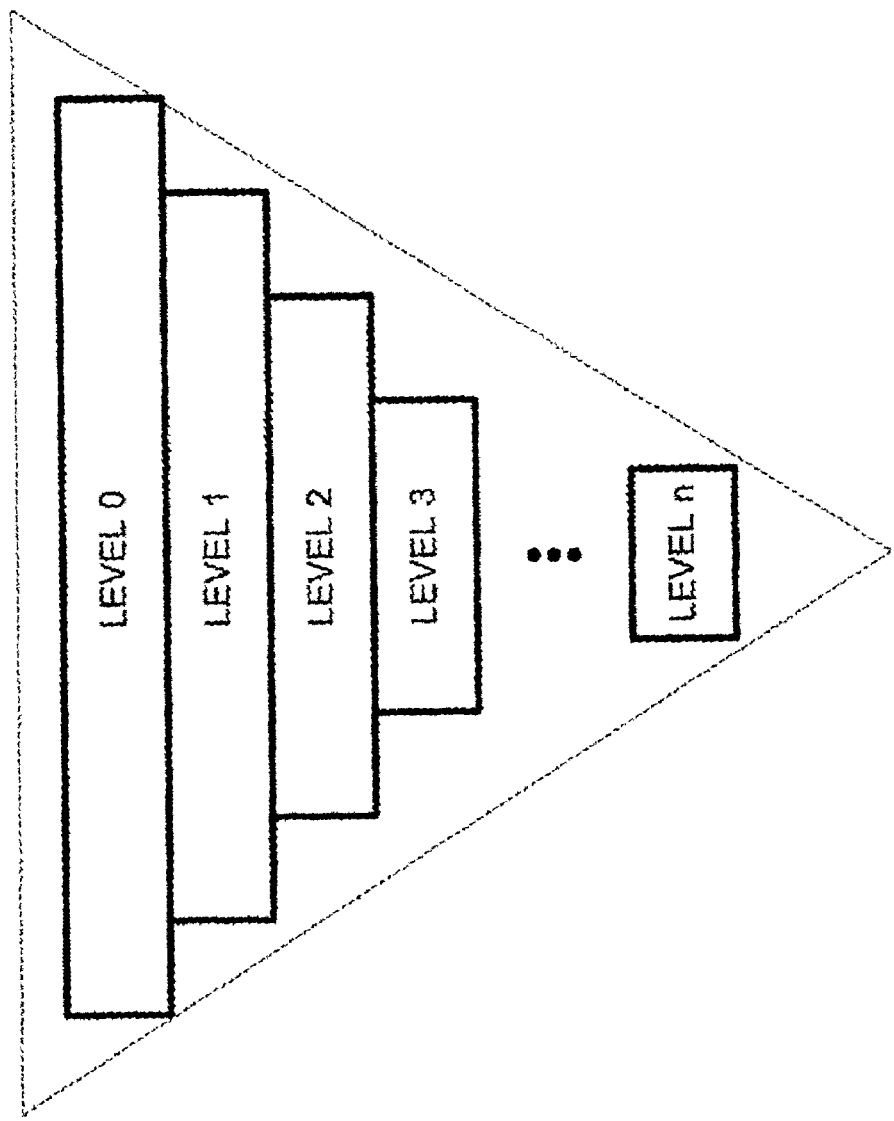
FIG. 1 illustrates a stylistic representation of a plurality of privilege levels for secured access in a computer system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide for I/O space access using security access systems. Embodiments of the present invention provide for a multiple I/O space and/or I/O-memory access table system to provide security during an I/O space access (e.g., accessing an I/O device) initiated by one or more processors in a computer system. Embodiments of the present invention also provide an I/O space access system that utilizes an I/O space access table and a secondary I/O access table, which results is increased security during I/O spaces and/or I/O-memory accesses.

Figure 2:
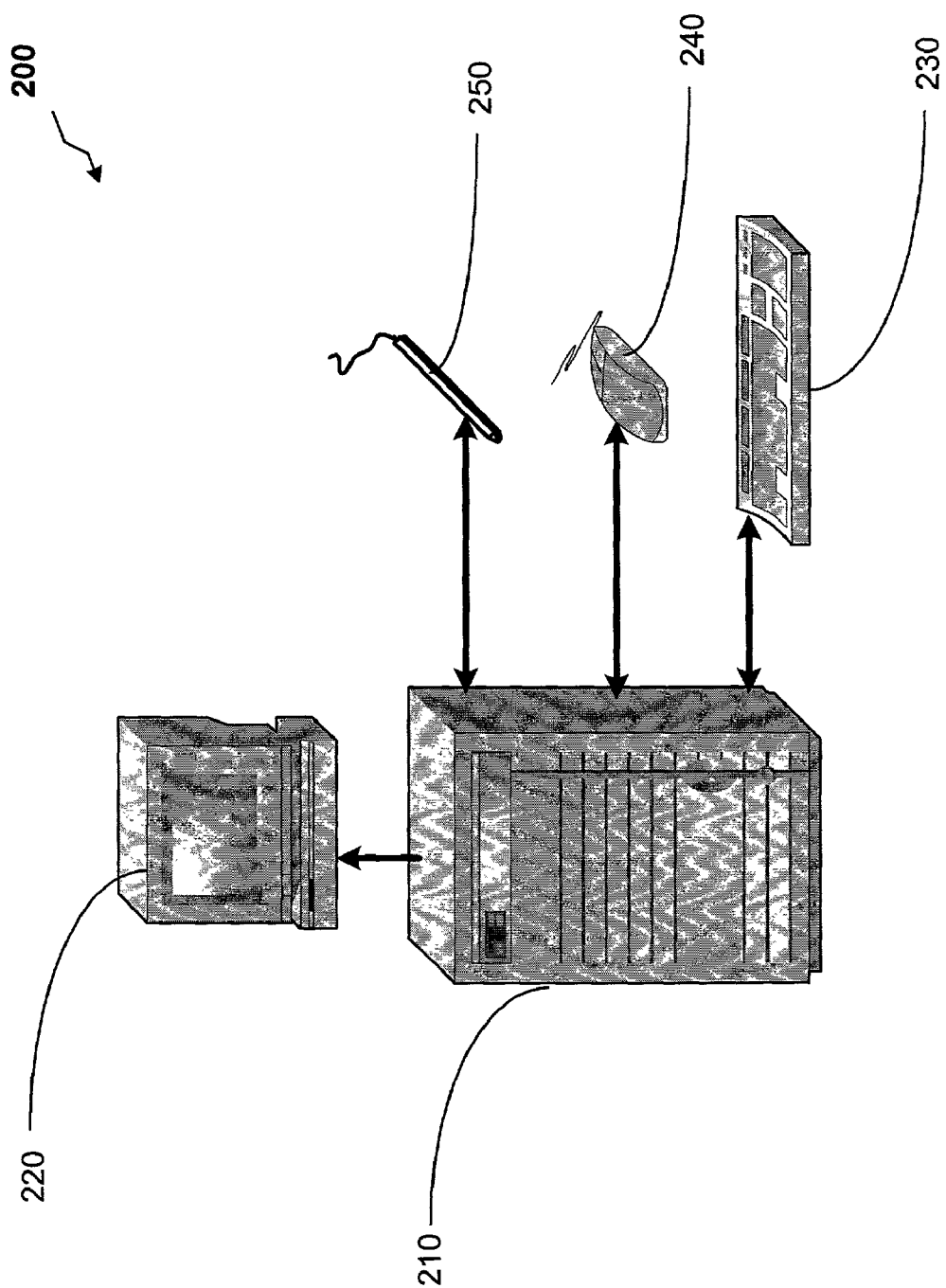
FIG. 2 is a block diagram of a computer system that may be utilized in accordance with one embodiment of the present invention.

Turning now to FIG. 2, one embodiment of a system 200 in accordance with the present invention is illustrated. The system 200 comprises a processing unit 210; a plurality of input/output devices, such as a keyboard 230, a mouse 240, an input pen 250; and a display unit 220, such as a monitor. The security level system disclosed by the present invention, in one embodiment, resides in the processing unit 210. An input from one of the input/output devices 230, 240, 250 may initiate the execution of one or more software structures, including the operating system, in the processing unit 210. I/O space and/or memory associated with an I/O space residing in the system 200 is then accessed to execute the various software structures residing in the processing unit 210. Embodiments of the present invention restrict I/O space accesses that are initiated by one or more software structures, based upon predetermined security entries programmed into the system 200.

Figure 3:
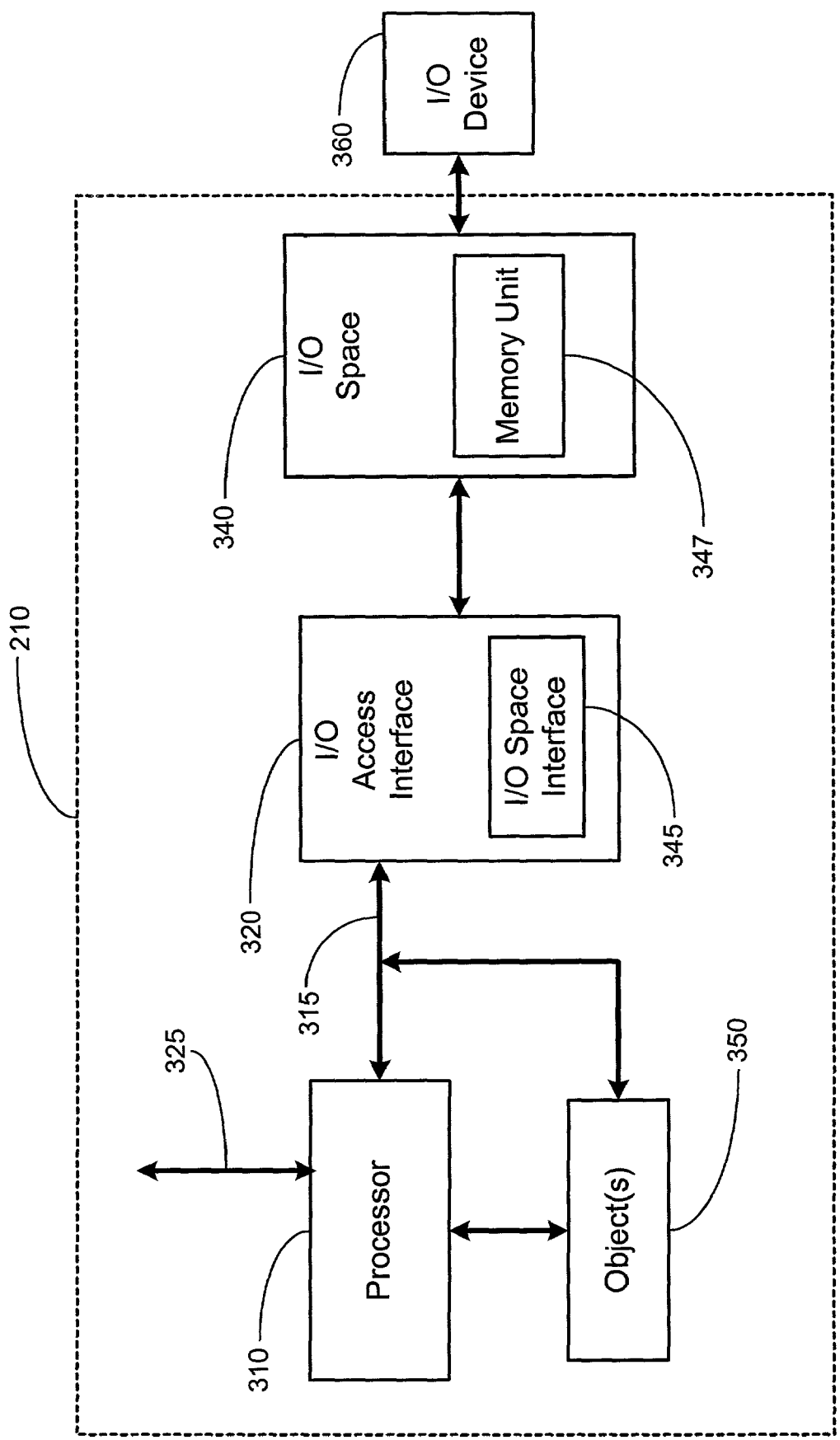
FIG. 3 is a more detailed block diagram representation of a processing unit shown in FIG. 2, in accordance with one embodiment of the present invention.

Turning now to FIG. 3, a simplified block diagram of one embodiment of the processing unit 210 in accordance with the present invention, is illustrated. The processing unit 210 in one embodiment, comprises a processor 310, an I/O access interface 320, an I/O space 340, and programmable objects 350, such as software objects or structures. The processor 310 may be a microprocessor, which may comprise a plurality of processors (not shown).

In one embodiment, the I/O space 340 provides a "gateway" to an I/O device 360, such as a modem, disk drive, hard-disk drive, CD-ROM drive, DVD-drive, PCMCIA card, and a variety of other input/output peripheral devices. In an alternative embodiment, the I/O space 340 is integrated within the I/O device 360. In one embodiment, the I/O space 340 comprises a memory unit 347 that contains data relating to addressing and communicating with the I/O space 340. The memory unit 347 comprises a physical memory section, that comprises physical memory such as magnetic tape memory, flash memory, random access memory, memory residing on semiconductor chips, and the like. The memory residing on semiconductor chips may take on any of a variety of forms, such as a synchronous dynamic random access memory (SDRAM), double-rate dynamic random access memory (DDRAM), or the like.

The processor 310 communicates with the I/O space 340 through the system I/O access interface 320. In one embodiment, the I/O access interface 320 is of a conventional construction, providing I/O space addresses and logic signals to the I/O space 340 to characterize the desired input/output data transactions. Embodiments of the present invention provides for the I/O access interface 320 to perform a multi-table, security-based access system.

The processor 310, in one embodiment is coupled to a host bus 315. The processor 310 communicates with the I/O access interface 320 and the objects 350 via the host bus 315. The I/O access interface 320 is coupled to the host bus 315 and the I/O space 340. The processor 310 is also coupled to a primary bus 325 that is used to communicate with peripheral devices. In one embodiment, the primary bus 325 is a peripheral component interconnect (PCI) bus (see PCI Specification, Rev. 2.1). A video controller (not shown) that drives the display unit 220 and other devices (e.g., PCI devices) are coupled to the primary bus 325. The computer system 200 may include other buses such as a secondary PCI bus (not shown) or other peripheral devices (not shown) known to those skilled in the art.

The processor 310 performs a plurality of computer processing operations based upon instructions from the objects 350. The objects 350 may comprise software structures that prompt the processor 310 to execute a plurality of functions. In addition, a plurality of subsections of the objects 350, such as operating systems, user-interface software systems, such as Microsoft Word®, and the like, may simultaneously reside and execute operations within the processor 310. Embodiments of the present invention provide for a security level access and privilege for the processor 310.

In response to execution of software codes provided by the objects 350, the processor 310 performs one or more I/O device accesses, including memory accesses, in order to execute the task prompted by the initiation of one or more objects 350. The I/O access performed by the processor 310 includes accessing I/O devices 360 to control the respective functions of the I/O devices 360, such as the operation of a modem. The I/O access performed by the processor 310 also includes accessing memory locations of I/O devices 360 for storage of execution codes and memory access to acquire data from stored memory locations.

Many times, certain I/O devices 360, or portions of I/O devices 360 are restricted for access by one or more selected objects 350. Likewise, certain data stored in particular memory locations of I/O devices 360 are restricted for access by one or more selected objects 350. Embodiments of the present invention provide for multi-table security access to restrict access to particular I/O devices 360, or memory locations of I/O devices 360, in the system 200. The processor 310 performs I/O space access via the I/O access interface 320. The I/O access interface 320 provides access to the I/O space 340, which may comprise a gateway to a plurality of I/O devices 360. A multi-table virtual memory access protocol is provided by at least one embodiment of the present invention.

Figure 4:
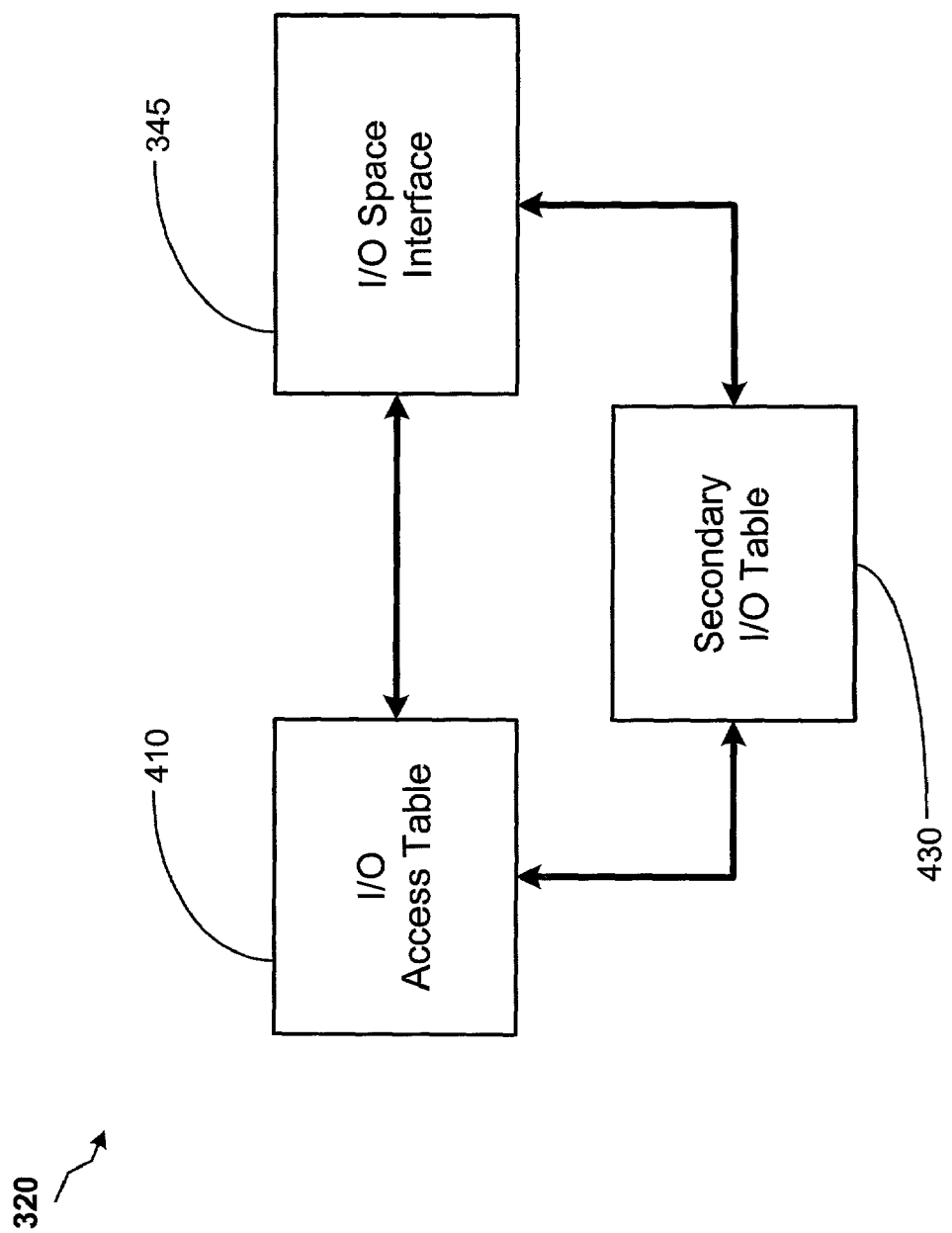
FIG. 4 is a more detailed block diagram representation of an I/O access interface shown in FIG. 3, in accordance with one embodiment of the present invention.

Turning now to FIG. 4, a block diagram depiction of one embodiment of the I/O access interface 320 in accordance with the present invention, is illustrated. In one embodiment, the I/O access interface 320 comprises an I/O access table 410, a secondary I/O table 430, and an I/O space interface 345. In one embodiment, the I/O space interface 345 represents a "virtual" I/O space address that can be used to address a physical location relating to an I/O device 360, or to a portion of an I/O device 360. The processor 310 can access the I/O space 340 by addressing the I/O space interface 345.

Embodiments of the present invention provide for performing I/O access using a multi-table I/O and memory access system. The multi-table I/O and memory access system utilized by embodiments of the present invention use a multilevel table addressing scheme (i.e., using the I/O access table 410 in conjunction with the secondary I/O table 430) to access I/O space addresses via the I/O space interface 345. The I/O memory addresses are used by the processor 310 to locate the desired physical I/O location.

The system 200 utilizes the I/O access table 410 in combination with at least one other table, such as the secondary I/O table 430, to define a virtual I/O space address. The I/O access table 410 and the secondary I/O access tables 430 are used to translate virtual I/O space addresses that lead to a physical I/O address. The physical I/O address points to a physical location of an I/O device 360 or to a memory location in the I/O device 360. The multi-level I/O access table system provided by embodiments of the present invention allows the secondary I/O table 430 to define entire sections of the I/O access table 410. In some instances, the secondary I/O table 430 may define a portion of a virtual I/O address that may not be present in the I/O access table 410. The secondary I/O table 430 can be used as a fine-tuning device that further defines a physical I/O location based upon a virtual I/O address generated by the I/O access table 410. This will result in more accurate and faster virtual I/O address definitions.

In one embodiment, the secondary table 430, which may comprise a plurality of subset tables within the secondary table 430, is stored in the memory unit 347, or the main memory (not shown) of the system 200. The secondary I/O tables 430 are stored at high security levels to prevent unsecured or unverified software structures or objects 350 to gain access to the secondary I/O table 430. In one embodiment, the processor 310 requests access to a location in a physical I/O device location based upon instructions sent by an object 350. In response to the memory access request made by the processor 310, the I/O access interface 320 prompts the I/O access table 410 to produce a virtual I/O address, which is further defined by the secondary I/O table 430. The virtual I/O address then points to a location in the I/O space interface 345. The processor 310 then requests an access to the virtual I/O location, which is then used to locate a corresponding location in the I/O device 360.

Figure 5A:
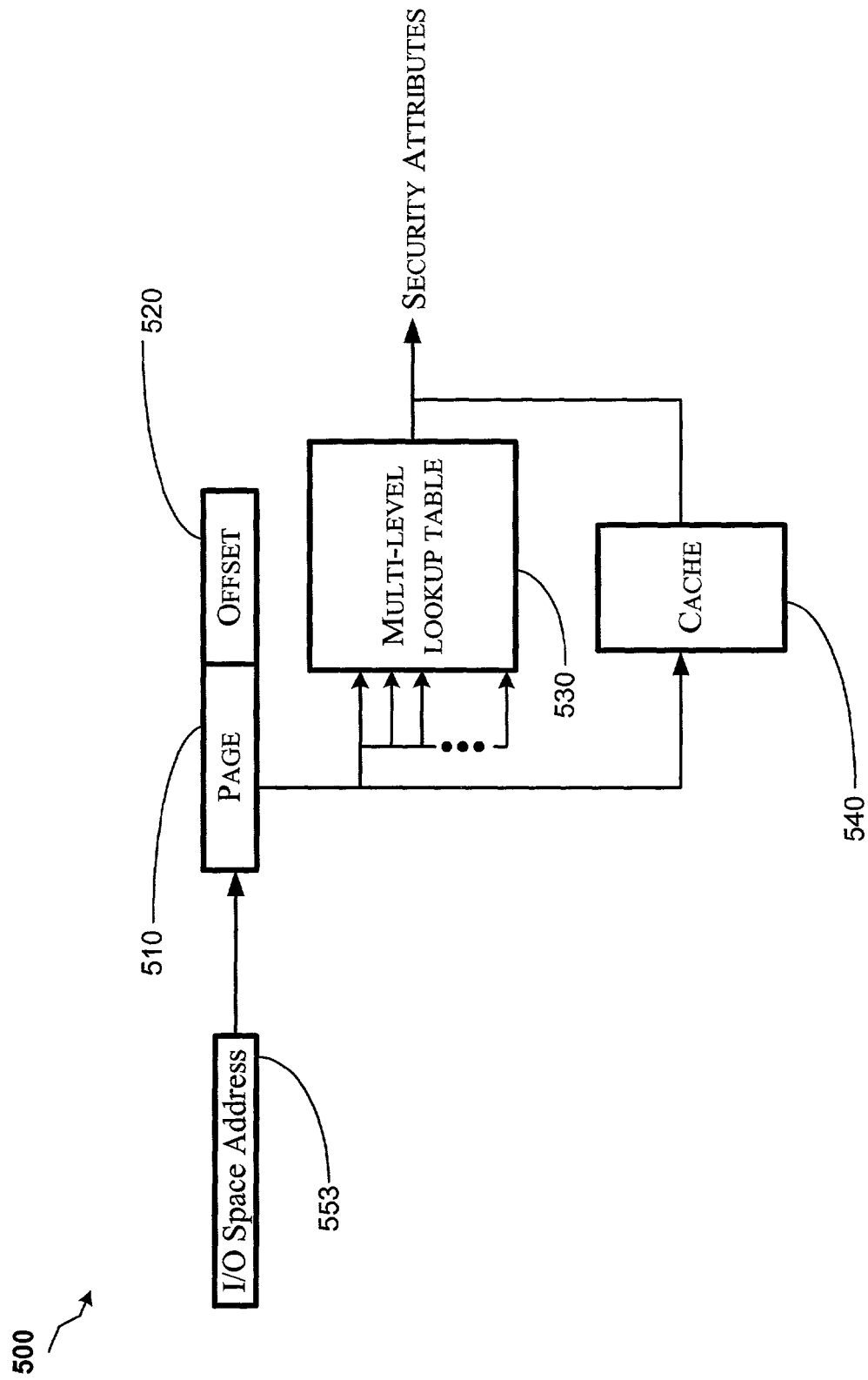
FIGS. 5A and 5B illustrate a block diagram representation of an I/O-space/I/O-memory access performed by the processor illustrated in FIGS. 1-4.
Figure 5B:
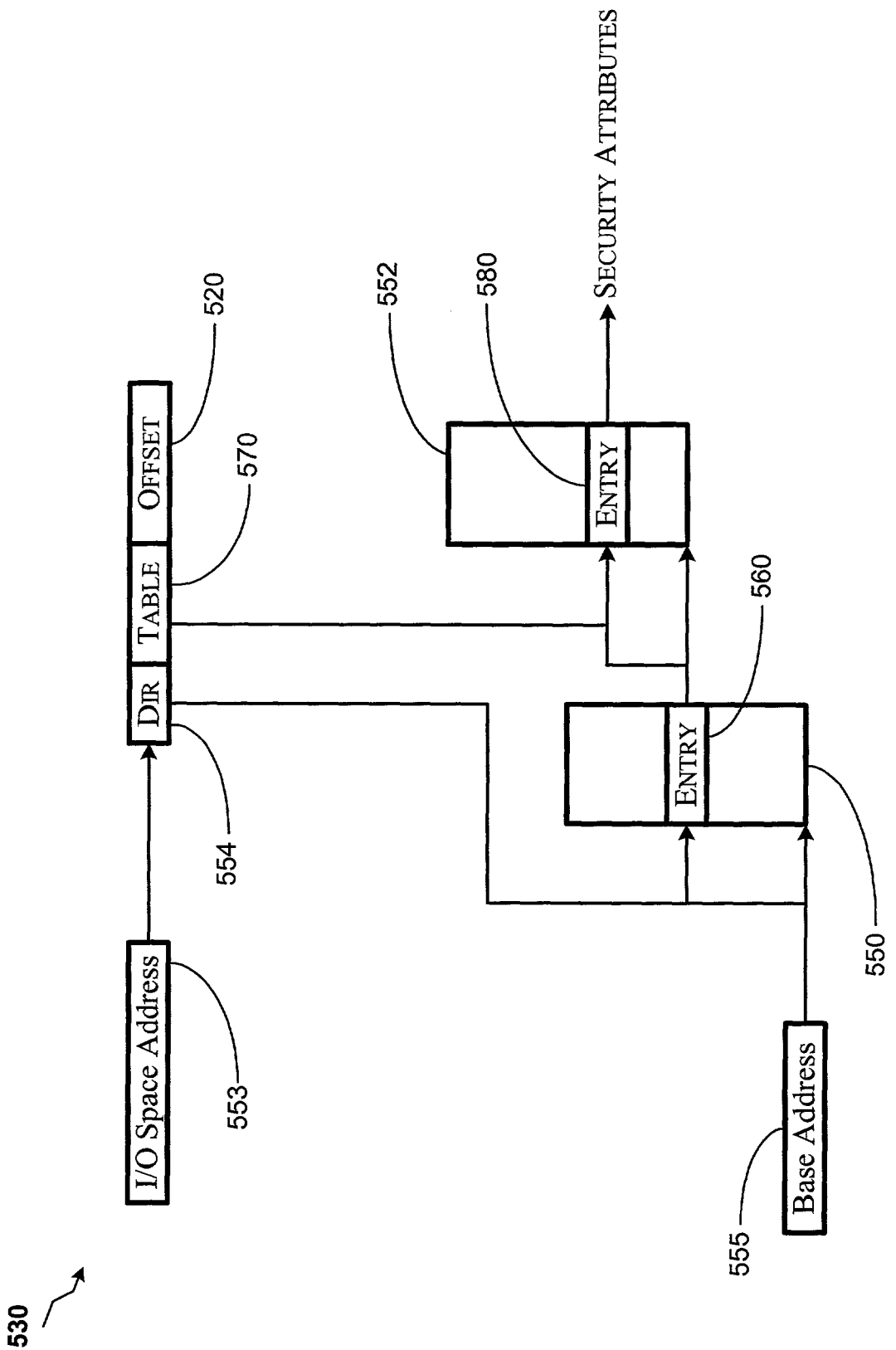

One embodiment of performing the memory access performed by the processor 310, is illustrated in FIG. 5A, FIG. 5B, and by the following description. Turning now to FIG. 5A, one illustrative embodiment of an I/O access system 500 for storing and retrieving security level attributes in a data processor or computer system 200 is shown. In one embodiment, the I/O access system 500 is integrated into the processing unit 210 in the system 200. The I/O access system 500 is useful in a data processor (not shown) that uses a multi-table security scheme for accessing I/O space 340. For example, the I/O access system 500 may be used by the processor 310 when addressing I/O space 340 using a paging scheme, such as paging schemes implemented in x86 type microprocessors. In one embodiment, a single memory page in an x86 system comprises 4 Kbytes of memory. Moreover, the I/O access system 500 finds particular applications in the processor 310 that assigns appropriate security level attributes at the page level.

The I/O access system 500 receives an I/O space address 553 that is composed of a page portion 510 and an offset portion 520, as opposed to a virtual, linear, or intermediate address that would be received by a paging unit in an x86 type microprocessor. In one embodiment, the page portion 510 data addresses an appropriate memory page, while the offset portion 520 data addresses a particular offset I/O location within the selected page portion 510. The I/O access system 500 receives the physical address, such as would be produced by a paging unit (not shown) in an x86 type microprocessor.

A multi-level lookup table 530, which is generally referred to as the extended security attributes table (ESAT), receives the page portion 510 of the physical I/O address. The multi-level lookup table 530 stores security attributes associated with each page 510 of memory. In other words, each page 510 has certain security level attributes associated with that page 510. In one embodiment, the security attributes associated with the page 510 is stored in the multi-level lookup table 530. For example, the security attributes associated with each page 510 may include look down, security context ID, lightweight call gate, read enable, write enable, execute, external master write enable, external master read enable, encrypt memory, security instructions enabled, etc. Many of these attributes are known to those skilled in the art having benefit of the present disclosure.

In one embodiment, the multi-level lookup table 530 is located in the system memory (not shown) of system 200. In an alternative embodiment, the multi-level lookup table 530 is integrated into the processor 310, which includes a microprocessor that employs the system 200. Accordingly, the speed at which the multi-level lookup table 530 is capable of operating is, at least in part, dependent upon the speed of the system memory. The speed of the system memory, as compared to the speed of the processor 310, is generally relatively slow. Thus, the process of retrieving the security attributes using the multi-level lookup table 530 may slow the overall operation of the system 200. To reduce the period of time required to locate and retrieve the security attributes, a cache 540 is implemented in parallel with the multi-level lookup table 530. The cache 540 may be located on the same semiconductor die as the processor 310 (i.e., the cache 540 and the processor 310 being integrated on one semiconductor chip) or external to the processor die. Generally, the speed of the cache 540 may be substantially faster than the speed of the multi-level lookup table 530. The cache 540 contains smaller subsets of the pages 510 and their security attributes contained within the multi-level lookup table 530. Thus, for the pages 510 stored in the cache 540, the operation of retrieving the security attributes may be substantially enhanced.

Turning now to FIG. 5B, one embodiment of the multi-level lookup table 530 used for storing and retrieving the security attributes associated with a page 510 in memory is illustrated. The multi-level lookup table 530 comprises a first table 550, which is generally referred to as an ESAT directory, and a second table 552, which is generally referred to as the ESAT. Generally, the first table 550 contains a directory of starting addresses for a plurality of ESATs 552 in which the security attributes for each of the pages 510 is stored. In the embodiment illustrated herein, a single ESAT directory 550 may be used to map the entire range of I/O addresses and/or memory within the I/O devices 360.

A first portion of the I/O space address 553, which includes the highest order bits and is generally referred to as the directory (DIR) 554, is used as a pointer into the first table 550. The I/O space address 553 may also comprise a portion that contains table data 570, which can identify the table 550, 552 being addressed. The I/O space address 553 further comprises the offset 520 within a table 550, 552 that leads to a particular entry 560, 580. The first table 550 is located in the system memory at a base address 555. The DIR portion 554 of the I/O space address 553 is added to the base address 555 to identify an entry 560, which points to a base address of an appropriate address in one of the second tables 552. In one embodiment, a plurality of the second tables 552 may be present in the multi-level lookup table 530. Generally, each one of the entries 560 in the first table 550 points to a starting address of one of the addresses in the second tables 552. In other words, each entry 580 may point to its own separate ESAT 552.

In one embodiment, the first table 550 and each of the second tables 552 occupy one page 510 in physical memory. Thus, a conventional memory management unit in an x86 type microprocessor with paging enabled is capable of swapping the tables 550, 552 in and out of the system memory, as needed. That is, because of the multi-level arrangement of the tables 550, 552, it is desirable that all of the tables 552 to be simultaneously present in the I/O space 340. If one of the tables 552 that is not currently located in the memory unit 347 is requested by an entry 560 in the first table 550, the conventional memory management unit (not shown) of the x86 microprocessor may read the page 510 from main memory, such as a hard disk drive, and store the requested page 510 in the system memory where it may be accessed. This one-page sizing of the tables 550, 552 reduces the amount of system memory needed to store the multi-level lookup table 530, and reduces the amount of memory swapping needed to access I/O space 340 using the tables 550, 552.

In one embodiment, each page is 4 Kbytes in size, and the system memory totals 16 Mbytes. Thus, approximately 4000 ESAT tables 552 may reside within a page 510. In one embodiment, the 4000 ESAT tables 552 each may contain 4000 sets of security attributes. Furthermore, the ESAT directory 550 contains the starting address for each of the 4000 ESAT tables 552. The entry 560 of the first table 550 points to the base address of the appropriate second table 552. A desired entry 580 in the appropriate second table 552 is identified by adding a second portion 552 (the table portion) of the I/O space address 553 to the base address 555 contained in the entry 560. In one embodiment, the entry 580 contains predetermined security attributes associated with the identified page 510 in the I/O space 340. The multi-table scheme illustrated in FIGS. 5A and 5B is an illustrative embodiment, those skilled in the art having benefit of the present disclosure may implement a variety of multi-table schemes in accordance with the present invention.

Turning now to FIG. 6, a flowchart depiction of the methods in accordance with one embodiment of the present invention, is illustrated. An object 350 is initiated by the system 200 (block 610). The object 350, such as a particular software program (e.g., Microsoft Word®), can be initiated by the activation of an input/output device such as a mouse 240. When the object 350 is initiated by the system 200, the processor 310 executes the code provided by the object 350 (block 620). The system 200 then establishes a security level based upon a pre-determined security level for the object 350 (block 630). The system 200 then invokes a multi-table I/O space access (block 640). The multi-table I/O space access performed by the system 200 is described in greater detail below. Based upon the security level that is established and the multi-level I/O space access performed by the system 200, the function(s) of the objects 350 are then executed (block 650). The functions of the object 350 may include reading a stored document, execution of a communications link initiated by a modem, such as a wireless modem, and the like.

Figure 7:
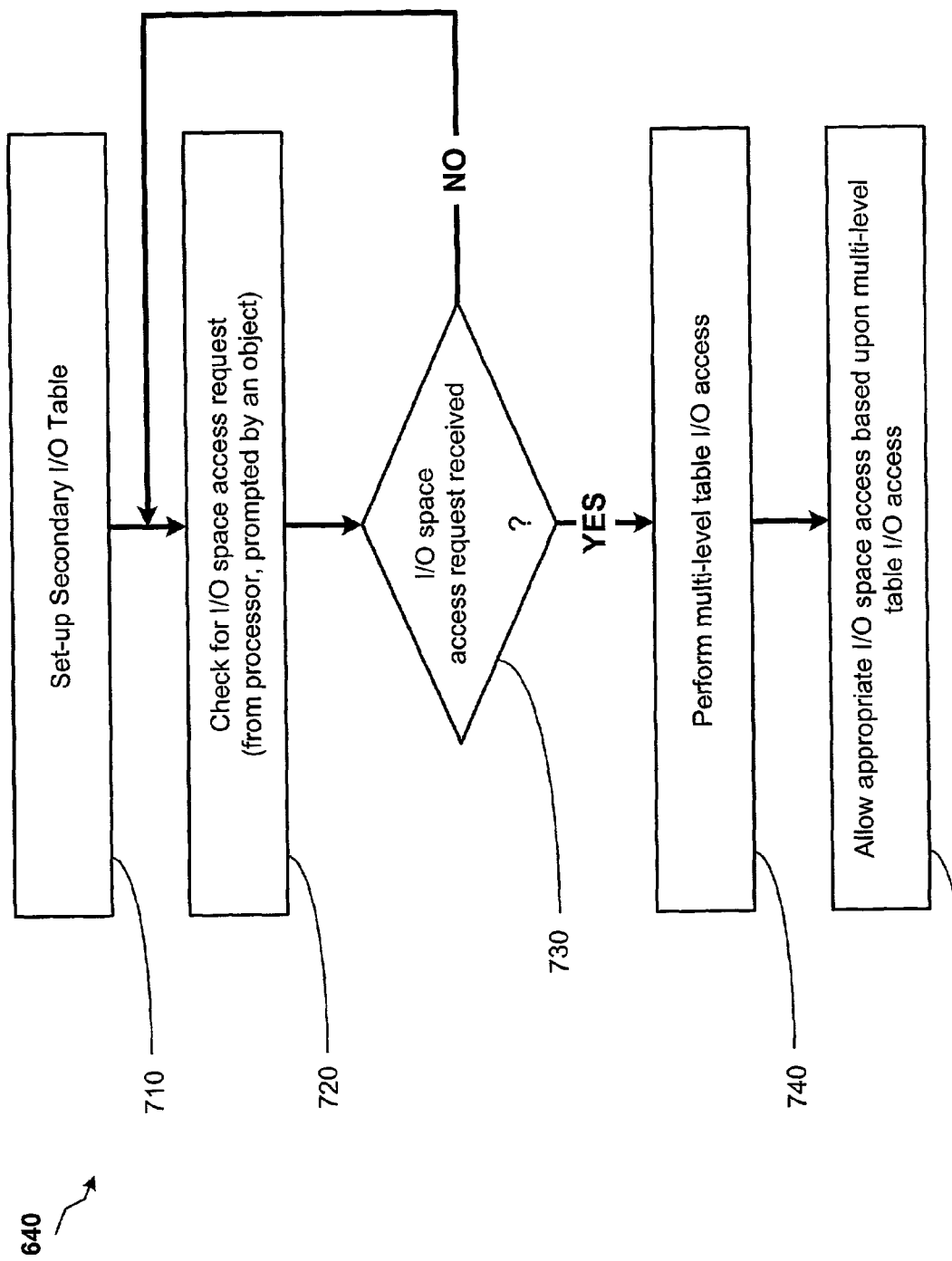
FIG. 7 illustrates a flowchart depiction of a method of performing a multi-table I/O-space/I/O-memory access described in FIG. 6, in accordance with one embodiment of the present invention.

Turning now to FIG. 7, a flowchart depiction of one embodiment of performing the multi-table I/O space access, described in block 640 of FIG. 6, is illustrated. The system 200 performs a secondary table set-up function (block 710). Setting-up the secondary I/O table 430 comprises placing and/or updating security level data in the secondary table 430. The secondary I/O table 430 can be used to define a plurality of sections within the I/O access table 410. The secondary I/O table 430 may contain data relating to entire sections of table entries (e.g., 560, 580 in FIG. 5B) that may be missing from the I/O access table 410.

In one embodiment, the system 200 divides I/O space 340 into pages 510, such that the processor 310 has access to I/O space 340 based upon the pages 510. In one embodiment, the pages 510 are defined to be memory sections of 4 kbytes, which is compatible with x86 processors. The I/O access table 410 and the secondary I/O table 430 contain indexes into the tables 410, 430. These indexes can be used to calculate a physical I/O space address 553 that can be used to access an I/O device 360 and/or locate a particular portion of an I/O device 360, such as the physical memory of an I/O device 360. Accessing of I/O space 340 using the tables 410, 430, performed by the processor 310, is provided in greater detail below.

Once the system 200 sets-up the secondary I/O table 430, the system 200 checks for I/O space access requests from the processor 310 (block 720). Memory access requests from the processor 310 are generally prompted by an object 350. Some objects 350 require extensive I/O space 340 and/or memory accesses to perform their respective tasks, such as initiating communications through a modem, retrieving data pertaining to a particular document, and the like. The system 200 makes a determination whether an I/O space access request was received (block 730). When the system determines that an I/O space access has not been received, the system 200 continues to check for I/O space access requests as indicated by the path from block 730 back to block 720 in FIG. 7.

When the system 200 makes a determination that an I/O space access has been requested, the system 200 performs a multi-level table access, in accordance with one embodiment of the present invention (block 740). A more detailed description of the multi-level table access performed by the system 200 is provided below. Once the system 200 performs the multi-table access described in block 740, the system 200 then allows appropriate I/O space access in response to the multi-level table access (block 750). In other words, system 200 allows the object 350, which prompted the processor 310 to request a memory request, to actually gain access to the I/O device 360 and/or physical memory within an I/O device 360.

Figure 8:
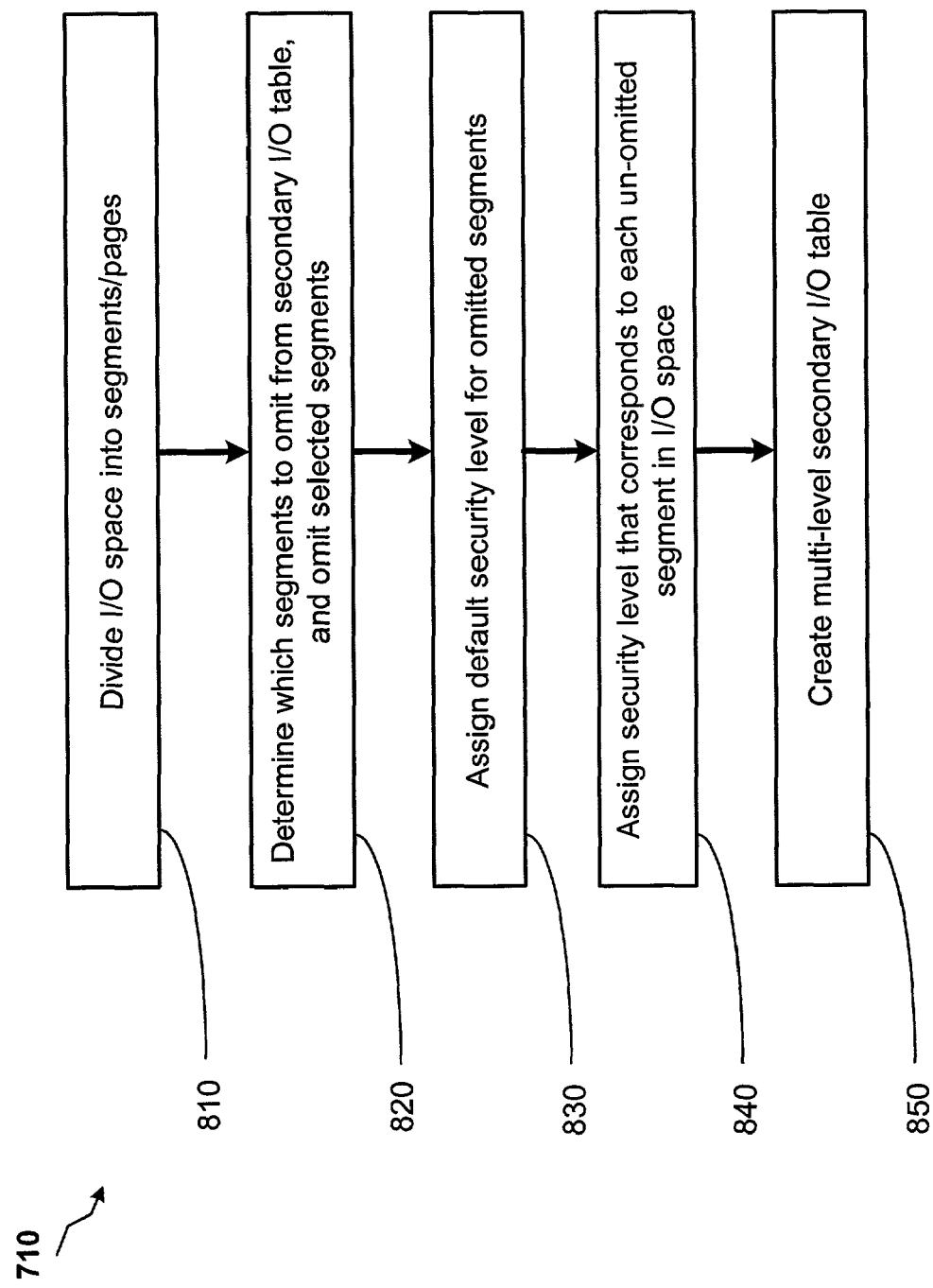
FIG. 8 illustrates a flowchart depiction of a method of setting up a secondary I/O table described in FIG. 7, in accordance with one embodiment of the present invention.

Turning now to FIG. 8, one embodiment of the method of setting up the secondary table 430, as indicated in block 710 of FIG. 7, is illustrated. The system 200 divides the I/O space 340 and/or memory in an I/O device 360 into a plurality of segments (block 810). These segments are often referred to as pages 510. In one embodiment, the segments/pages 510 are divided into memory equivalent of four kilobytes. In one embodiment, the division of the I/O space 340 into 4 Kbytes segments can be performed by hardware processes known to those skilled in the art having benefit of the present disclosure. In an alternative embodiment, the division of the I/O space 340 into segments can be performed using software techniques known to those skilled in the art having benefit of the present disclosure.

The system 200 determines which segments to omit from the secondary table 430 and performs an omitting function (block 820). The segments that are omitted from the secondary table 430 are pages 510 that can be assigned a default security level. The omitted segments comprise pages 510 that can be allocated a broad-level or a low-level security level. Therefore, the system 200 assigns a default security level for omitted segments (block 830). The lowest security level is assigned to the omitted segments, therefore the omitted segments can be accessed by virtually any software object 350 that prompts the processor 310 to access I/O space 340 and/or memory.

The system 200 then assigns a security level that corresponds to each un-omitted segment/page 510 in the I/O space 340 (block 840). The system 200 assigns a security level to the pages 510 based upon expected accesses by particular objects 350 via the processor 310. The system 200 protects certain hardware devices and other memory locations in the processor unit 210 while assigning appropriate security levels to the un-omitted segments/pages 510.

Once the security levels are assigned, the system 200 correlates particular segments/pages 510 with an initial or virtual I/O space address 553 (block 850). The virtual I/O space addresses 553 may point to particular I/O devices 360 and/or memory in an I/O device 360 based upon particular security levels. The system 200 then utilizes the correlation of virtual I/O space addresses 553 to segments in the I/O space 340 to create a multi-level secondary I/O table 430 (block 850). In one embodiment, particular spaces in the secondary I/O table 430 are omitted in order to save memory resources. As described above, the omitted memory locations are assigned a default security level, which is generally the lowest security level.

Figure 9:
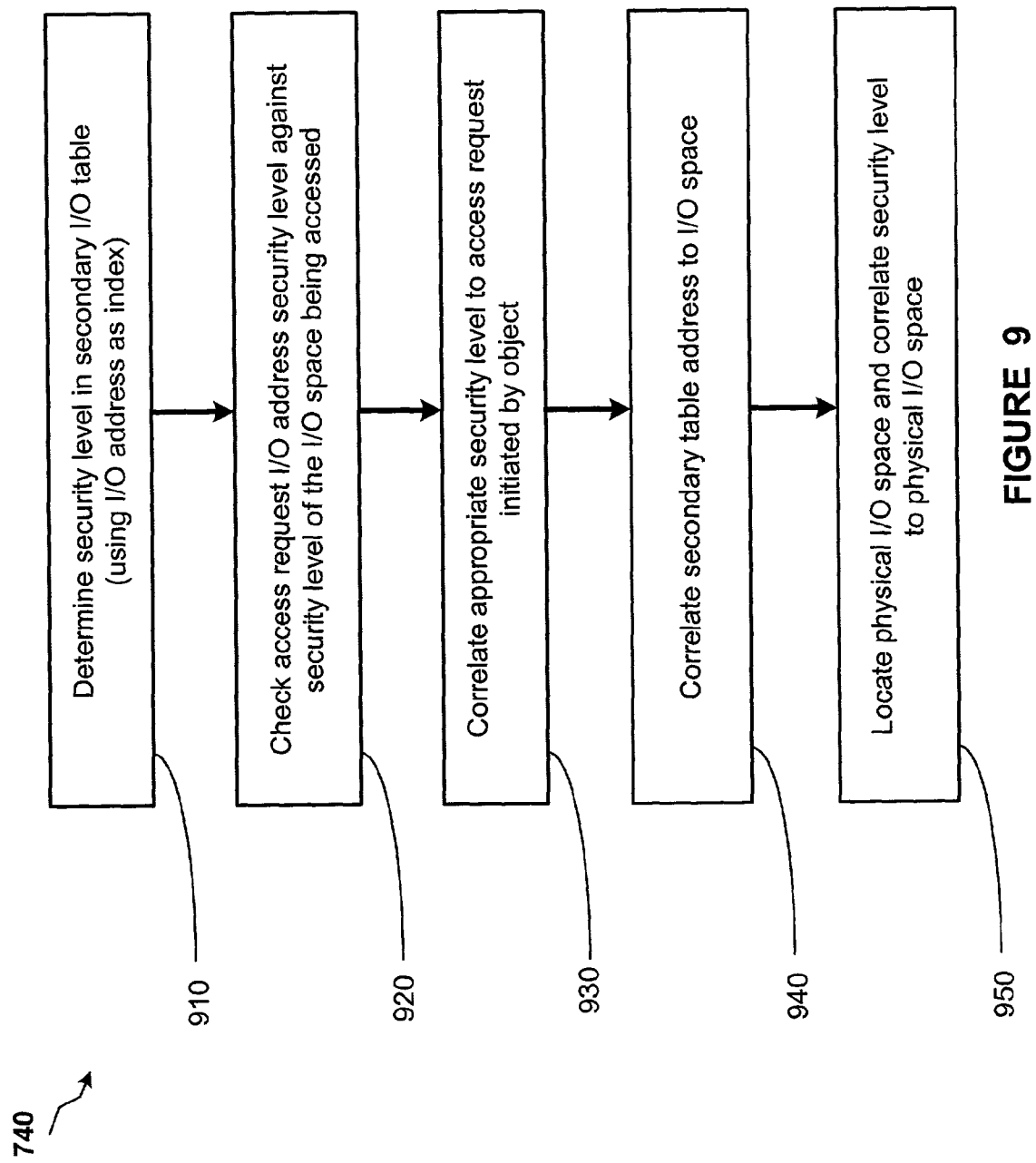
FIG. 9 illustrates a flowchart depiction of a method of performing a multi-level table access described in FIG. 7, in accordance with one embodiment of the present invention.

Turning now to FIG. 9, one embodiment of performing the multi-level table access process indicated in block 740 of FIG. 7, is illustrated. After receiving a request for I/O space access, the system 200 determines a security level in the secondary I/O table 430 in response to the requested I/O space access (block 910). The system 200 determines the security level in the secondary table 430 based upon the I/O space access in response to an indication to the processor 310 regarding a type of object 350 that initiates the execution of software in the processor 310. Certain software objects 350 require a more high-level security access that allows access to certain sensitive I/O devices and/or data in memory. For example, a software object 350 that requires a communication transfer of data would require a high security-level clearance in order to access sensitive data from the processor unit 310. In contrast, a software object 350 that performs the function of a data processor, such as Microsoft Word®, would require a low-level of security clearance to perform its task.

The system 200 then examines the execution security level of the software object 350 initiating the I/O space access request, and the security level of the page 510 that is the target of the I/O space access (block 920). The processor 310 compares the security level of the currently executing software object 350 against the security level of the page 510 that is the target of the I/O space 340 and/or memory access, in order to determine a match (i.e., whether to allow the requested I/O space 340 and/or memory access). This prevents certain software objects 350 that are unauthorized to access certain I/O devices 360 and/or sensitive data in the physical memory of I/O devices 360, from accessing and controlling certain I/O devices 360 and/or memory locations. The system 200 then correlates the appropriate security level to the particular access request initiated by the software object 350 (block 930).

The system 200 then correlates a secondary I/O table 430 address to the I/O space interface 345 location that corresponds to a location in the I/O space 340 and/or memory (block 940). The system 200 locates the I/O space 340 and correlates the appropriate security level to the physical I/O space 340 (block 950). In one embodiment, the I/O space access interface 320 performs the locating of the I/O space interface 345 location, and the correlating of the I/O space interface 345 location to a location in the I/O space 340.

Figure 10:
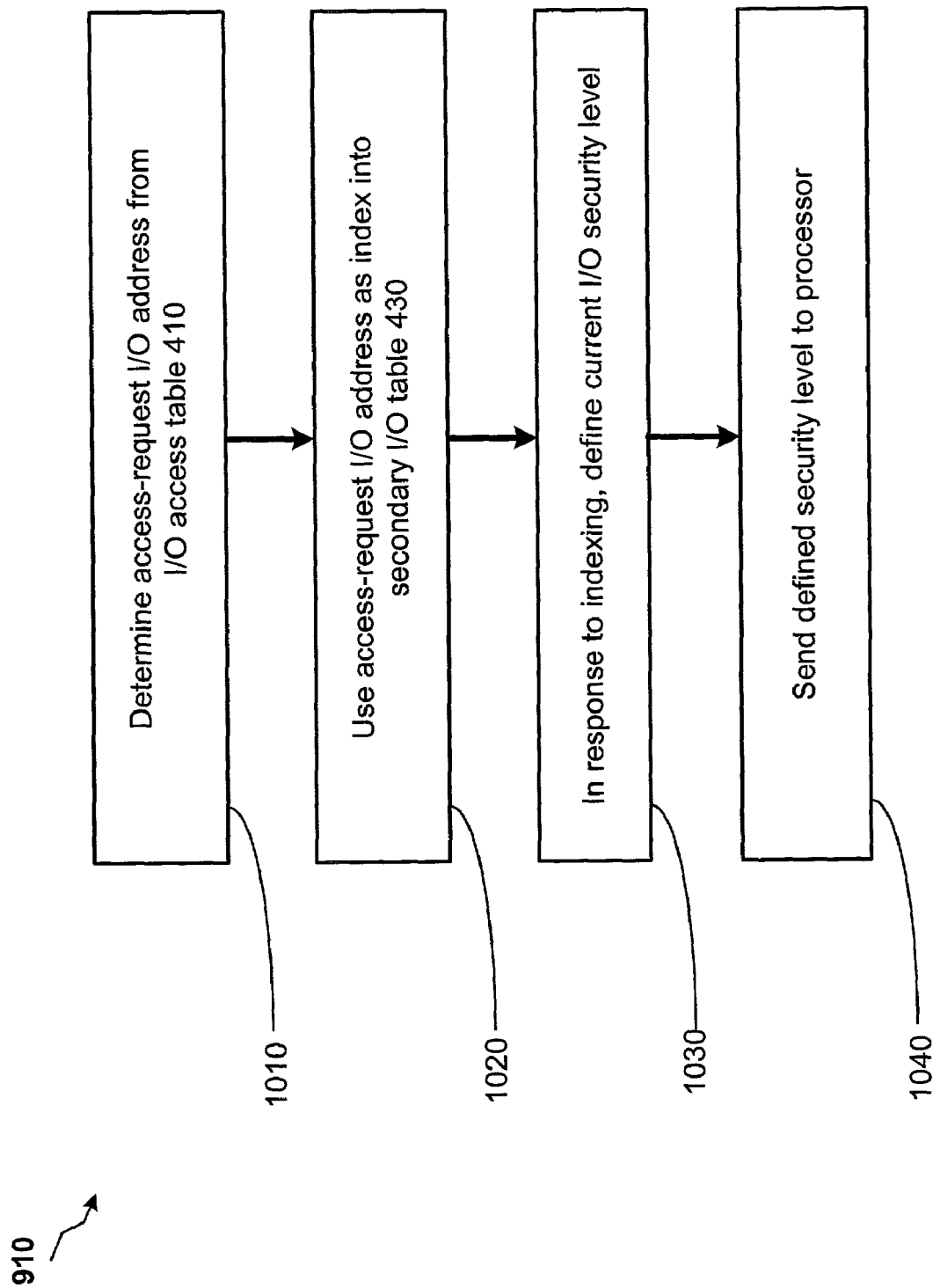
FIG. 10 illustrates a flowchart depiction of a method of determining a security level in the secondary I/O table, as described in FIG. 9, in accordance with one embodiment of the present invention.

Turning now to FIG. 10, one embodiment of determining the security level in the secondary table 430 in response to a memory access request of the processor 310, as indicated in block 910 of FIG. 9, is illustrated. The system 200 determines the I/O space address 553 that is responsive to the I/O space access request from the I/O access table 410 (block 1010). The system 200 then locates the segment/page 510 that is being executed by the processor 310 responsive to the software object 350, based upon the physical I/O space address 553 (e.g., using the address as an index into the secondary I/O table 430) (block 1020). The system 200, when executing code based upon the software object 350, determines the security level of the page 510 from which the processor 310 is executing, which can define the current security level. Therefore, the system 200 effectively uses the segment/page 510 to define the security level (block 1030). The system 200 then sends the defined security level to the processor 310 to perform a proper I/O space access (block 1040). The completion of the steps illustrated in FIG. 10 substantially completes the step of determining security level in the secondary I/O table 430, as indicated in the block 910 of FIG. 9.

Figure 11:
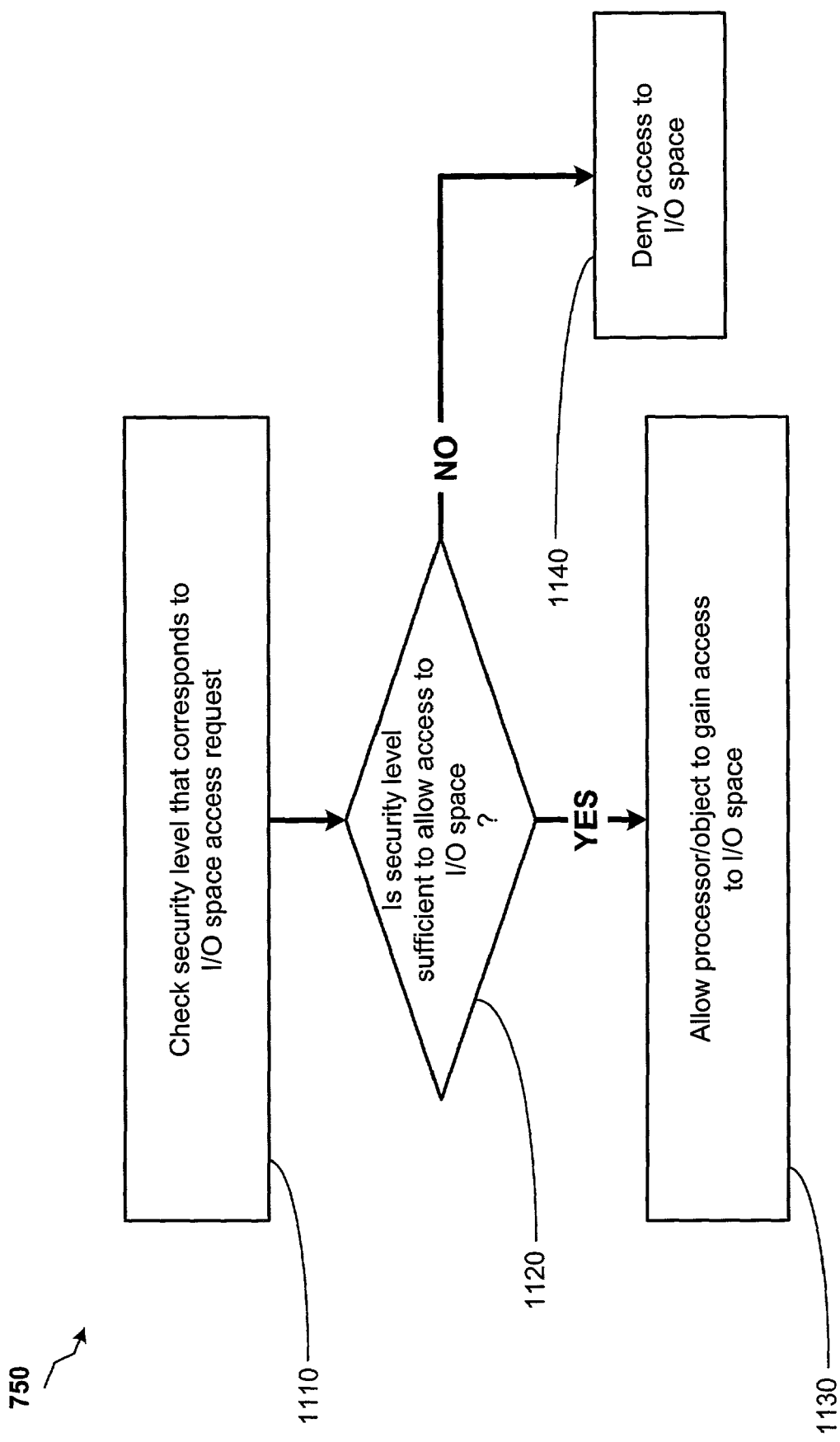
FIG. 11 illustrates a flowchart depiction of a method of facilitating appropriate I/O-space/I/O-memory access in response to the multi-level table access, as described in FIG. 7, in accordance with one embodiment of the present invention.

Turning now to FIG. 11, a flowchart depiction of one embodiment of the steps for performing the appropriate I/O space access described in block 750 of FIG. 7 is illustrated. The system 200 checks the security level that corresponds to a particular memory access request (block 1110). The security level can be correlated with a particular I/O space access request based upon the particular software object 350 being executed by the processor 310. The system 200 then determines whether the security level is sufficient to allow access to an I/O-resource/I/O-memory (e.g., an I/O device 360 and/or a portion of memory of an I/O device 360) (block 1120). The system 200 checks to see if the security level clearance is appropriate to allow the I/O space access requested by the processor 310 and gain access to particular I/O devices 360 and/or memory locations within the I/O devices 360.

When the system 200 determines that the security level is not high enough to allow I/O-resources/I/O-memory access based upon a particular I/O space access request made by the processor 310, the system 200 denies the requested I/O-resources/I/O-memory access (block 1140). When the system 200 determines that the security level is indeed sufficient to allow the requested I/O-resources/I/O-memory access, the system 200 allows the processor 310 or the software object 350 to gain access to a particular I/O device 360 and/or a memory location within an I/O device 360 in the physical memory 345 (block 1130). The completion of the steps indicated in FIG. 11 substantially completes the process of allowing the appropriate memory access as indicated in block 750 of FIG. 7. The principles taught by the present invention can be implemented into other types of automated frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    executing a software object;
    establishing a security level for said software object, wherein the security level is directly related to said software object;
    performing a multi-table input/output (I/O) space access using at least one of said security levels, wherein performing the multi-table I/O space access further comprises:
        establishing a secondary I/O table;
        receiving an I/O space access request based upon executing of said software object;
        performing a multi-level table access based upon said I/O space access request using said secondary table and at least one virtual memory table; and
        accessing at least a portion an I/O device based upon said multi-level table access; and
    executing a function of said software object, wherein executing said function comprising accessing at least a portion of said input/output space.

2. The method described in claim 1, wherein executing a software object further comprises using a processor to process software code of said software object.

3. The method described in claim 1, wherein establishing a security level for said software object further comprises assigning a security level relating to an I/O space access of at least a portion of a memory.

4. The method described in claim 1, wherein establishing a secondary table further comprises:
    dividing an I/O space into a plurality of segments;
    determining at least one of said segment to omit from said secondary I/O table and at least one un-omitted segment;
    assigning a default security level to said omitted segment;
    assigning a security level to said un-omitted segment; and
    correlate at least one assigned segment with an I/O space location.

5. The method described in claim 1, wherein performing a multi-level table access based upon said I/O space access request further comprises:
    determining at least one security level that corresponds to a segment in said secondary I/O table;
    verifying a match between an execution security level to a security level associated with a segment being accessed in response to an execution of said object;
    determining an I/O space addresses based upon said secondary table in response to a match between said execution security level and said security level associated with said segment being accessed; and
    locating an I/O device corresponding to said I/O space address.

6. The method described in claim 5, wherein determining at least one security level that corresponds to a segment in said secondary I/O table comprises:
    determining a physical I/O device address from said secondary I/O table;
    determining a segment being executed based upon said physical I/O device address; and
    defining a current security level based upon said determining of said segment being executed.

7. A method, comprising:
    executing a software object;
    establishing a security level for said software object;
    establishing a secondary input/output (I/O) table;
    receiving an I/O space access request based upon executing of said software object;
    determining at least one security level that corresponds to a segment in said secondary I/O table;
    verifying a match between an execution security level to a security level associated with a segment being accessed in response to an execution of said software object;
    determining an I/O space address based upon said secondary I/O table in response to a match between said execution security level and said security level associated with said segment being accessed;
    locating a physical I/O device location corresponding to said I/O space address; and
    accessing a portion of an I/O device based upon locating said physical memory location.

8. The method described in claim 7, wherein executing a software object further comprises using a processor to process software code of said software object.

9. The method described in claim 7, wherein establishing a security level for said software object further comprises assigning a security level relating to an I/O space access of at least a portion of an I/O device.

10. The method described in claim 7, wherein determining at least one security level that corresponds to a segment in said secondary I/O table comprises:
    determining a physical I/O device address from said I/O space table;
    determining a segment being executed based upon said physical I/O device address; and
    defining a current security level based upon said determining of said segment being executed.

11. An apparatus, comprising:
    means for executing a software object;
    means for establishing a security level for said software object;
    means for performing a multi-table input/output (I/O) space access using at least one of said security levels, wherein means for performing the multi-table I/O space access further comprises:
        means for establishing a secondary I/O table;
        means for receiving an I/O space access request based upon executing of said software object;
        means for performing a multi-level table access based upon said I/O space access request using said secondary table and at least one virtual memory table; and means for accessing at least a portion an I/O device based upon said multi-level table access; and means for executing a function of said object, wherein means for executing said function comprising means for accessing at least a portion of said input/output space.

12. An apparatus, comprising:

a processor coupled to a bus;

means for coupling at least one software object to said processor;

an input/output (I/O) device; and an (I/O) access interface coupled to said bus and a memory unit, said (I/O) access interface to provide said processor a multi-level table I/O space access of at least a portion of said memory unit based upon at least one security level, in response to said processor executing said software object, wherein the security level is directly related to said software object wherein said I/O space access interface comprises an I/O space access table coupled with a secondary I/O table, said memory access interface to provide a virtual memory addressing scheme to access at least one portion of said I/O device based upon a security level.

13. The apparatus of claim 12, wherein said processor comprises at least one microprocessor.

14. The apparatus of claim 12, wherein said I/O device comprises a memory that comprises at least one of a magnetic tape memory, a flash memory, a random access memory, and a memory residing on a semiconductor chip.

15. A computer readable program storage device encoded with instructions that, when executed by a computer, performs a method, comprising:

executing a software object;

establishing a security level for said software object;

establishing a secondary input/output (I/O) table;

receiving an I/O space access request based upon executing of said software object;

determining at least one security level that corresponds to a segment in said secondary I/O table;

verifying a match between an execution security level to a security level associated with a segment being accessed in response to an execution of said software object;

determining an I/O space addresses based upon said secondary I/O table in response to a match between said execution security level and said security level associated with said segment being accessed;

locating a physical I/O device location corresponding to said I/O space address; and accessing a portion of an I/O device based upon locating said physical memory location.

16. The computer readable program storage device encoded with instructions that, when executed by a computer, performs the method described in claim 15, wherein executing a software object further comprises using a processor to process software code of said software object.

17. The computer readable program storage device encoded with instructions that, when executed by a computer, performs the method described in claim 15, wherein establishing a security level for said software object further comprises assigning a security level relating to an I/O space access of at least a portion of an I/O device.

18. The computer readable program storage device encoded with instructions that, when executed by a computer, performs the method described in claim 15, wherein determining at least one security level that corresponds to a segment in said secondary I/O table comprises:

determining a physical I/O device address from said I/O space table;

determining a segment being executed based upon said physical I/O device address; and defining a current security level based upon said determining of said segment being executed.

* * * * *